Feb. 7, 1961
E. F. WEBB
2,970,335
WINDSHIELD CLEARING SYSTEM
Filed Jan. 23, 1958
3 Sheets-Sheet 1
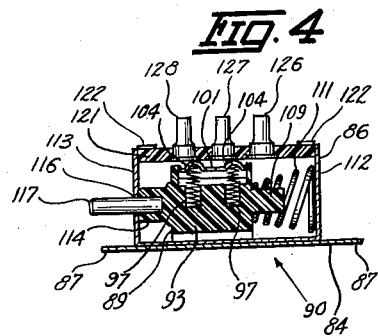
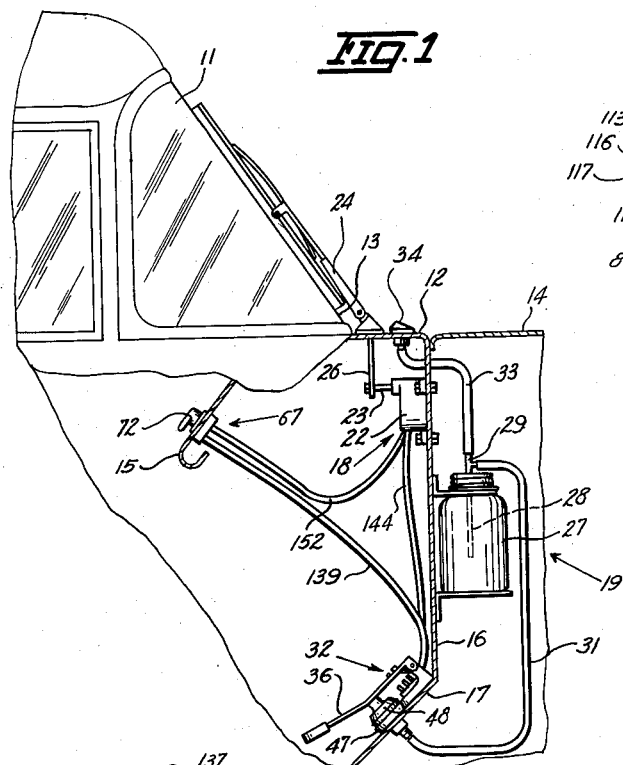
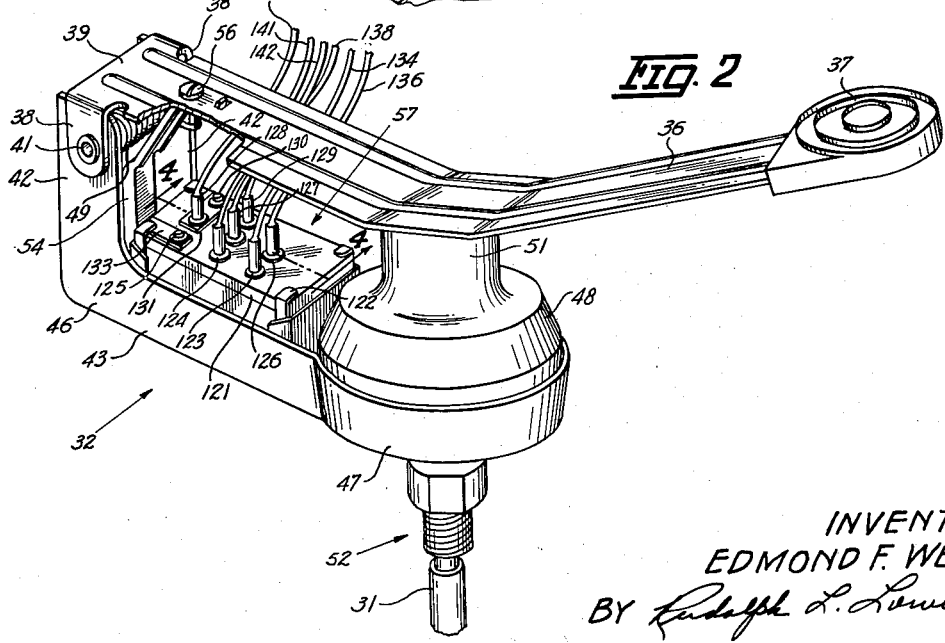
INVENTOR.
EDMOND F. WEBB
BY *Rudolph L. Lowell*
ATTORNEY.

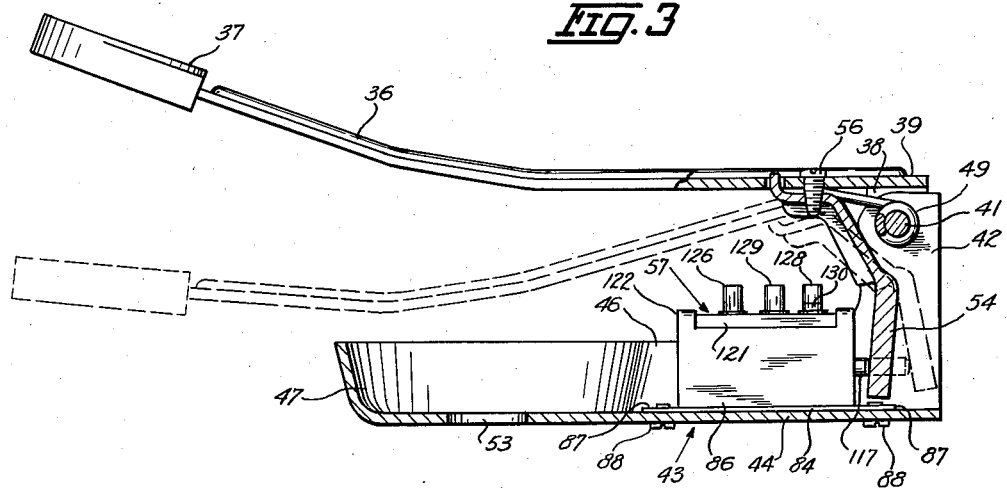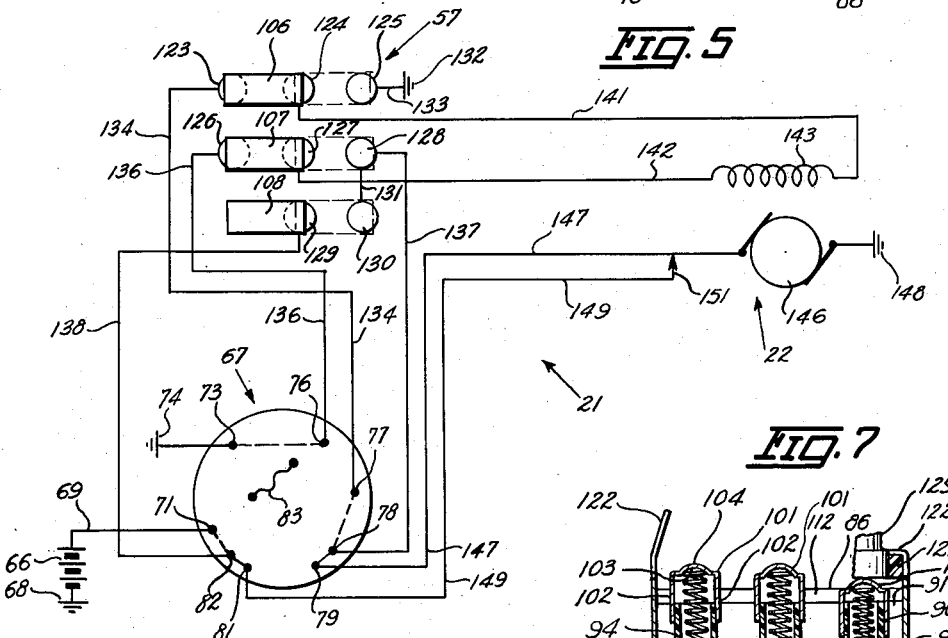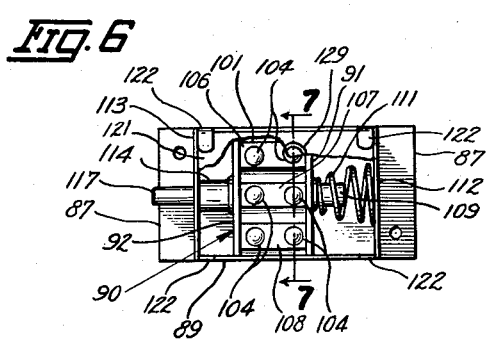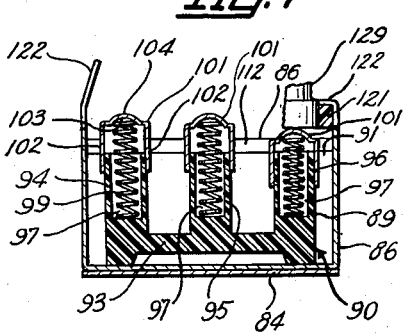

Feb. 7, 1961  E. F. WEBB  2,970,335
WINDSHIELD CLEARING SYSTEM
Filed Jan. 23, 1958  3 Sheets-Sheet 3
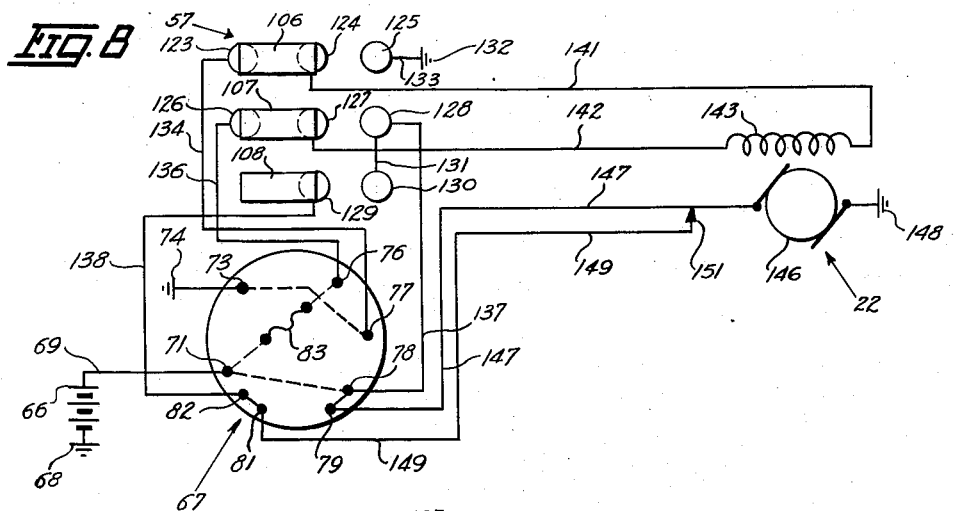
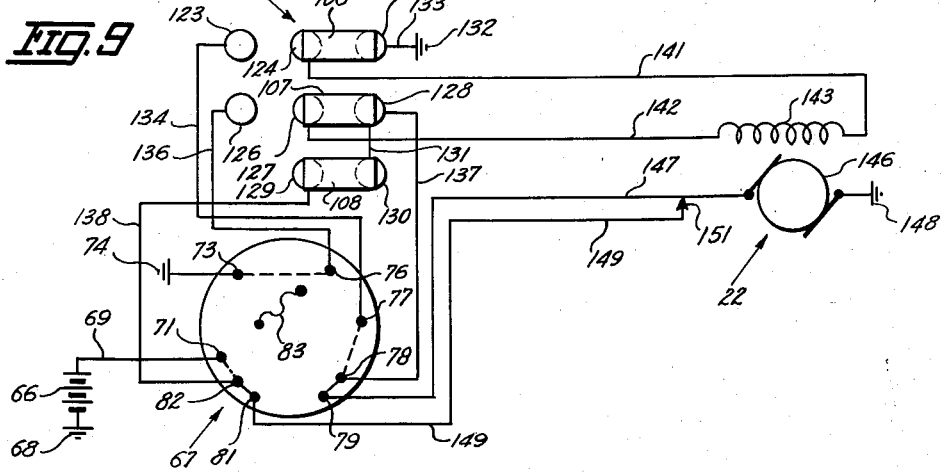
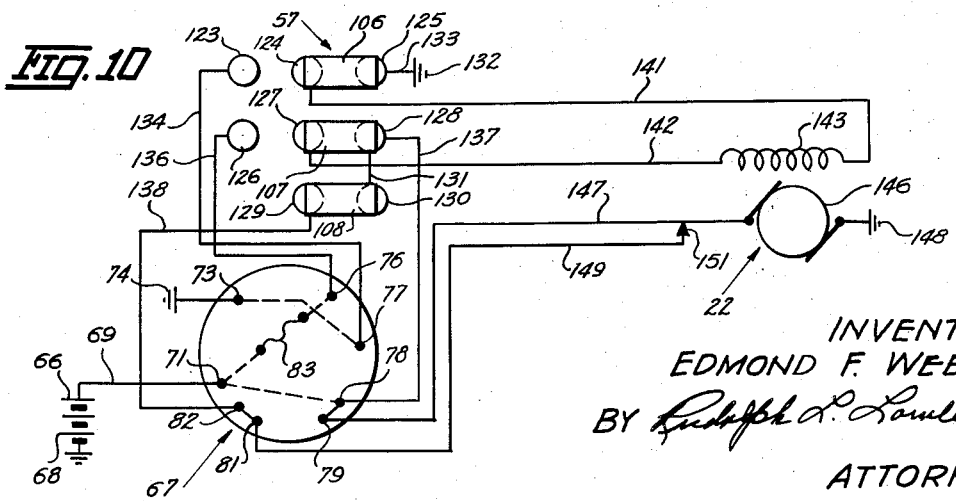
INVENTOR.
EDMOND F. WEBB
BY
ATTORNEY.

United States Patent Office 2,970,335
Patented Feb. 7, 1961

2,970,335
WINDSHIELD CLEARING SYSTEM

Edmond F. Webb, Franklin, Mich., assignor to The Delman Company, Cookeville, Tenn., a corporation of Tennessee Filed Jan. 23, 1958, Ser. No. 710,807
2 Claims. (Cl. 15—250.02)

This invention relates to windshield clearing systems employing an electrically operated wiper unit and a mechanically operated washer unit and more particularly to the provision of circuitry control means for the selective operation of the units separately or in combination.

Present day utilization of electric motors for the operation of windshield wipers requires the provision of circuitry controlled so as to reverse the direction of rotation of the motor output in order to return the windshield wipers from a normal oscillating position or stage to a park position. The introduction of a manually actuated washer unit into such a clearing system presented the problem of providing a circuit for selectively controlling the operation of the wiper and the washer units separately or in combination.

Concomitant with the problem of providing a new control circuitry was the problem of providing a relatively inexpensive switch in the circuit, the operation of which was dependent on the position of the foot lever of the washer unit. The role of this switch in the control circuit would thus provide the necessary connections for actuating the motor to operate the wipers in a normal manner subsequent to a reversal of the motor by hand operated switch means in the circuit.

Therefore, it is an object of this invention to provide a control circuitry for a windshield clearing system employing an electric wiper unit and a washer unit.

Another object of the present invention is to provide a control circuit for such a system capable of operating the wiper unit either separately or in conjunction with operation of the washer unit.

A further object of this invention is to provide a windshield clearing system including an electric wiper unit and a mechanical washer unit, an electrical control unit including a plurality of circuits alternately changeable between a series and a parallel relationship whereby each circuit is capable of controlling the wiper unit, and circuit selecting switches.

It is another object of this invention to provide a windshield clearing system including an electric wiper unit and a mechanical washer unit, and an electrical control circuit wherein a hand-operated switch is operable to control the wiper unit, and wherein a foot-actuated lever is operable to simultaneously actuate the washer unit and the wiper unit by switch means independently or in combination with the hand-operated switch.

Another object of this invention is to provide a windshield clearing system including an electrical wiper unit and a mechanical washer unit, and electrical control circuit for the system, a hand-operated switch interposed in the circuit, and another switch interposed in the circuit and actuated by movement of a foot-depressible lever operable to actuate the washer unit, the hand-operated switch capable of reversing the motor of the wiper unit so as to change the wiper's movement from one of operation to one of park, and the foot-actuated switch capable of changing the wiper's movement from one of park to one of operation, and vice versa, independently of the hand-operated switch.

Yet a further object of this invention is to provide an electrical circuit for controlling the rotation of the armature of a windshield wiper motor, including a pair of switches in said circuit selectively operable to reverse the direction of current through the field of the armature, one of the switches being actuated by movement of a lever operable also to actuate a windshield washer unit.

Another object of this invention is to provide a control circuit for selectively operating the electric wiper unit and the washing unit in a vehicle windshield clearing system, which is of a simple construction, economical in cost and installation, and capable of operating both units in combination by means of a foot movement.

These and other objects will be apparent from reference to the following description and the accompanying drawings, wherein:

Fig. 1 is a fragmentary foreshortened longitudinal sectional view of an automobile showing a windshield clearing system embodying the control circuitry of this invention;

Fig. 2 is an enlarged perspective view of a foot operated pump and switch unit shown in Fig. 1;

Fig. 3 is an enlarged side elevational view of the unit of Fig. 2, the foot lever and associated parts being shown in alternate positions, some of the parts being deleted and others shown in section for clarity;

Fig. 4 is a longitudinal sectional view of the foot-operated switch of Fig. 2, taken along the lines 4—4 thereof;

Fig. 5 is a schematic wiring diagram of the control circuit for the windshield clearing system;

Fig. 6 is a top plan view of the switch of Fig. 2 with the cover plate thereof partly broken away;

Fig. 7 is a transverse sectional view along the lines 7—7 of Fig. 6; and

Figs. 8–10, inclusive, are schematic wiring diagrams similar to Fig. 5 and showing the alternate circuitry arrangement of the control circuit as determined by the switches therein.

With reference to the drawings, there is illustrated in Fig. 1 a windshield clearing system as applied to an automobile having a windshield 11, an engine cowl 12 extended forwardly from the lower front edge 13 of the windshield 11, and an engine hood 14 positioned forwardly of the front of the cowl 12. The automobile is further equipped with an instrument panel or dashboard 15, with the usual fire wall 16, and an upwardly and forwardly inclined floorboard section 17 which joins with the lower end of the fire wall 16.

The windshield clearing system includes a windshield wiper unit and a windshield washer unit designated generally as 18 and 19, respectively, and controlled by a control circuit, indicated generally at 21 (Fig. 5). The wiper unit 18 includes an electric wiper motor 22 mounted on the fire wall 16, and having a drive shaft 23 connected with a pair of wipers 24 (only one of which is shown) through a conventional transmission mechanism indicated at 26 (Fig. 1).

The windshield washer unit 19 includes a liquid glass container or reservoir 27 the inside of which is connected by a tube 28 to a valve 29. A fluid transmitting line 31 connects the valve 29 to a pump assembly 32 mounted on the inclined floorboard portion 17 such that the fluid connection is below the portion 17. Another fluid transmitting line 33 is connected from the reservoir valve 29 to a discharge nozzle device 34 mounted on the cowl 12.

Operation of the washer unit 19 is initiated by actuation of the pump assembly 32 (Fig. 2) which includes a foot lever 36 having a pad 37 at one end thereof. A pair of flanges 38 depend in transverse alignment from the other end 39 of the lever 36 and are pivotally attached, as by a rivet 41 to the upstanding transversely spaced portions 42 of a base element 43. The element 43 includes a base plate 44 (Fig. 3) having upstanding side portions 46 circularly formed at one end of the element 43 to form a retainer 47 for a bellows 48. A spring 49 is inserted over the rivet 41 and is conventionally arranged to bias the lever 36 upward and away from a depressing engagement with the top 51 of the bellows 48.

The bellows 48 is fluid tight and houses a spring (not shown) which normally biases the bellows in an expanded position. Fluid connection of the pump bellows 48 with the line 31 is provided by an outlet unit 52, inserted through an opening 53 (Fig. 3) in the base plate 44, into the bellows 48 in a fluid tight manner.

An actuating arm 54 (Figs. 2 and 3), secured to the end 39 of the lever 36 as by a screw 56 and movable therewith, is operatively connected with an electric switch unit 57 securely mounted on the base plate 44 between the side portions 46 and intermediate the ends of the base element 43. The function of the elements 54 and 57 will be detailed hereinafter.

Before describing the control circuit 21 for the windshield clearing period, it should be mentioned that the arrangement of the wiper motor 22, the transmission mechanism 26 and the wipers 24 is such that the rotation of the motor drive shaft 23 determines the operating stages of the wipers. Depending upon the rotational direction of the motor armature, rotation of the drive shaft 23 in one direction—for example, forward, for the sake of convenient terminology—results in the wipers 24 being oscillated across the windshield in a normal operating manner or stage. Rotation of the drive shaft in an opposite direction—for example, in a reverse direction—results in the wipers being rotated toward and into a parked position or stage.

As will be described more in detail hereinafter, movement of the wipers into a parked position automatically opens a switch—closed during normal operation of the wipers—in the control circuit 21 (Fig. 5) whereby the operation of the motor 22 is stopped and thus the wipers 24 are halted at their parked stage in a substantially horizontal position along the surface of the cowl 12 and off the windshield 11. A detailed description of the wiper parking switch, although a necessary part of the control circuitry as will be seen hereinafter, is not thought necessary. Suffice it to state that this parking switch is provided as a part of the wiper motor assembly in cars of Chrysler manufacture, and that its operation in the present invention is similar in all respects to its operation in those vehicles.

The components of the control circuit 21 (Fig. 5) include a source of power, such as the vehicle battery 66, a hand-operated switch 67 mounted on the dashboard 15, the switch unit 57 (Fig. 2) mounted on the pump base element 43 and actuated by the foot lever 36, the electric motor 22 (Fig. 1) and electric current transmitting lines interconnecting these elements (Fig. 5).

The battery 66 is grounded on one side at 68 and connected at the other side by a line 69 to a terminal 71 in the switch 67. The hand operated switch 67 is a two position switch, as determined by a control knob 72 (Fig. 1), and includes the terminal 71, terminal 73 connected to a ground 74, terminals 76 and 77, interconnected pairs of terminals 78, 79 and 81, 82 respectively, and a resistance element 83.

The hand-operated switch 67 is shown in one position, which shall hereinafter be termed the park position, in Figs. 5 and 9, and is shown in the other position, which shall hereinafter be termed the on position, in Figs. 8 and 10. When in the park position, the terminals 71—82, 73—76, and 77—78 are interconnected in pairs for the transmission of current therebetween. When in the on position, the terminals 71—78, 71—76 and 73—77 are interconnected in pairs.

The foot-operated switch unit 57, best shown in Figs. 2-4 and 6-7, is comprised of a base housing including a base plate 84 (Fig. 4) and an open-top, box housing 86 secured to said plate 84. The widths of the plate and the housing are equal (Fig. 7) but the plate 84 is longer than the housing 86 whereby the ends 87, 87 of the plate extend beyond the housing and are adapted to be secured to the base plate 44 of the pump base elements 43, as by screws 88 (Fig. 3).

An electric contact carrier assembly 90 is slideably mounted in the housing 86 for movement longitudinally of the housing 86 and of the base element 43 and includes a carrier block 89 (Figs. 4, 6 and 7) of plastic or the like having upstanding end panels 91, 92 (Fig. 6) mounted in and integral with a base 93. A trio of transversely spaced, longitudinally elongated support members 94, 95 and 96 (Figs. 6 and 7) are mounted on and integral with the base 93 between the end panels 91, 92, and each support member has a pair of longitudinally spaced wells 97 formed therein. A spring 99 is inserted in each well and extends above the height of the sides of the housing 86 (Fig. 7).

A metallic contact cap 101 of an inverted U-shape (Fig. 7) and having a length equal to the spacing between the end panels 91, 92 is loosely inserted over each support member 94—96, whereby the sides 102 of a cap depend adjacent the respective sides of a support member to prevent lateral movement of the cap (Fig. 7). The top of each cap 101 is provided with a pair of cavities 103 (Figs. 4 and 6) which are longitudinally spaced so that each cavity is vertically aligned with a spring 99 that extends upwardly into a respective cavity 103.

By virtue of each cavity, a contact 104 is formed on top of the contact cap, it being obvious that three transversely spaced rows 106, 107, and 108 (Fig. 6) of pairs of longitudinally spaced and aligned contacts 104 are thereby formed, whereby each row is a conductor of current, as between the contacts therein.

A projection 109 (Fig. 6) extends longitudinally outwardly from one end panel 91 for the purpose of locating and retaining thereagainst one end of a spring 111, the other end of the spring 111 being retained, due to the spring being under compression, against an end wall 112 of the housing 86. The spring 111 thus biases the contact carrier assembly 90 toward the other end wall 113.

Another projection 114 (Fig. 6) extends horizontally outwardly of the end panel 92 and is adapted to abut the end wall 113 of the housing, in which an opening 116 (Fig. 4) is formed. An elongated pusher element 117 extends outwardly from the projection 114 through the opening 116 and is in constant contact with the actuating arm 54 (Fig. 3). As the bias of the spring 49 against the lever 36 is greater than that of the spring 111 against the contact carrier assembly 90, it is seen that the carrier assembly 90 is normally under compression within the switch unit housing 86 wherein the projection 114 is spaced from the end wall 113.

This compressed position of the contact carrier assembly 90, which shall hereinafter be termed the "park" position of the switch unit 57, is in comparison to the non-compressed position of the assembly 90, due to the foot lever 36 being depressed for a pump bellows 48 actuation, wherein the projection 114 abuts the end wall 113 by virtue of the action of the spring 114, and by virtue of the counterclockwise movement of the actuating arm 54, as viewed in Fig. 3. The latter or non-compressed position of the carrier assembly 90 shall hereinafter be termed the "on" position of the switch unit 57.

A terminal cap 121 (Figs. 2 and 3) is secured on the top of the switch housing 86, as by corner flange extensions 122 of the housing being bent over the cap. The cap 121 is provided with eight terminals arranged in three transversely spaced, longitudinally extending rows of three, three and two (Fig. 5). The terminals in each row are spaced longitudinally apart a distance substantially equal to the longitudinal spacing between the contacts 104, and are superimposed over the three rows of contacts 106–108, in a manner best shown in Fig. 5.

Thus, it is noted that terminals 123, 124 and 125 are superimposed over the contacts of row 106, that terminals 126, 127 and 128 are over row 107, and terminals 129 and 130 are over row 108 of contacts 104. By virtue of the same spacing of contacts and terminals, when the rows of contacts 106–108 are in the "park" position, indicated by the solid line blocks in Fig. 5, terminals 123—124 and 126—127 are interconnected due to their respective contacting or touching relation with the contacts 104 of the rows 106 and 107; and when the contact rows are in the "on" position, indicated by the dotted line blocks in Fig. 5, terminals 124—125, 127—128, and 129—130 are interconnected for the passage of current therebetween, again due to their respective touching relation with the contacts 104 in the three contact rows. For a purpose to appear hereinafter, the terminals 128 and 130 are interconnected, as by a metallic plate 131 (Fig. 2), and the terminal 125 is grounded at 132, as by a plate 133 (Fig. 2) contacting a corner 122 of the housing 86, which in turn is grounded through the pump assembly base 44 to the vehicle.

Terminals 123, 126, 128 and 129 of the switch 57 are connected to the terminals 77, 76, 78 and 82 of the switch 67 by leads 134, 136, 137 and 138, respectively (Fig. 5), these leads adapted to being bound in one group 139 (Fig. 1). Terminals 124 and 127 are each connected by leads 141 and 142 respectively to a respective side of the field 143 of the wiper motor 22, and the leads 141, 142 are adapted to being bound in a group 144 (Fig. 1). The terminal 79 of the hand switch 67 is connected to one side of the motor armature 146 by a lead 147, the other side of the armature being grounded to the vehicle at 148; and the terminal 81 is connected by a lead 149 to the lead 147 in front of the armature 146 through the normally open automatic parking switch 151 mentioned hereinbefore. The leads 147 and 149 are adapted to being bound in a group 152 (Fig. 1).

In the operation of the windshield clearing system, assuming that the hand-operated switch 67 is in the "park" position, as indicated by the dotted terminal interconnecting lines within the switch (Fig. 5), and assuming that the foot operated switch 57 is also in the "park" position, as indicated by the solid-lined blocks—representing the contact rows 106–108—in Fig. 5, battery current from terminals 71—82 through lead 138 to the terminal 129 in switch 57 is stopped as the terminals 129—130 are not interconnected; and through lead 149 via terminal 81 is also stopped by the open switch 151, due to the wipers being in a parked position.

Referring now to Fig. 8, the hand-operated switch 67 has been turned to its "on" position, as indicated by the dotted terminal interconnecting lines within the switch, whereas the foot switch 57 remains in its "park" position. Battery current flows from the terminals 71—78—79 within the switch 67 through the lead 147 to the motor armature 146 and to ground 148. Current for the field 143 also originates at the battery terminal 71, through the resistance 83, the terminal 76 and the lead 136 to the terminal 126 in the switch 57 which is in series with the switch 67 relative to the field circuit. Here the current crosses contact row 107 to the terminal 127 and is transmitted through the lead 142 to the left side of the armature field 143, as viewed in Fig. 8. The current passes through the field back through the lead 141 to the terminal 124, across the contact row 106 to the terminal 123, through the lead 134 to the terminal 77 of the switch 67 and through the terminal 73 to the switch ground 74.

It is here to be noted that the direction of current through the motor armature 146 and the field 143 is the same, whereby the wipers 24 are operated by the transmission mechanism 26 in a forward, normal operating, oscillating stage. As the wipers are out of their "park" stage, the switch 151 is now automatically closed. It may also be noted that the value of the resistance unit 83 may be varied or cut out completely, whereby to vary the value of the current passing through the motor armature 146.

Assuming that the hand-operated switch 67 is turned back to a "park" position, with the switch 57 still remaining in "park," the circuitry of Fig. 5 is again relevant, the only change from the description hereinbefore with respect to Fig. 8 being that the switch 151 is now closed. Current now passes through the switch 151 and the lead 147 to the armature 146 and to ground 148. Current also passes back through the lead 147 to the terminals 79—78—77 of the switch 67, and through the lead 134 to the terminal 123 of the switch 57. The current crosses the contact row 106 to terminal 124 and through the lead 141 to the right side of the field 143, as viewed in Fig. 5 and as compared hereinbefore to the current coming to the left side of the field. The current passes through the field 143 from right to left—reverse the direction of the current passing through the armature 146 from left to right—and back to the terminal 127 of the switch 57 via lead 142. The current crosses the contact row 107 to the terminal 126 and is transmitted through the lead 136 to the terminal 76 of the switch 67, where it is transmitted via the terminal 73 to the ground 74.

It is obvious that as the current through the field 142 is reversed and is opposite the direction of current through the armature 146, the rotational output of the motor shaft 23 will be reversed that of the circuitry of Fig. 8, and the wipers 24 will be rotated toward and into a park position; whereupon, as the wipers are moved out of their normal oscillating position and off the windshield 11, the switch 151 will be automatically opened with the armature and the field circuits thus being open.

Referring now to Fig. 9, it is assumed that the switch 67 is in the "park" position and the switch 57 has been moved to the "on" position by virtue of the foot lever 36 having been depressed for the purpose of supplying fluid to the windshield. It is not thought necessary to describe the operational mechanics of the washer unit 19, as those skilled in the art are quite familiar with this type of unit.

Comparing Fig. 9 with Figs. 7 and 8, it is noted that the contact rows 106–108 have been moved to the right, as indicated, wherein different pairs of terminals in the switch 57 are now interconnected by the contact rows. With respect to the armature circuit, the battery current passes from the terminals 71—82 directly to the switch 57 terminal 129 via lead 138. The contact row 108 transmits the current to terminal 130 from whence it passes across the plate 131 to the terminal 128.

From the terminal 128, the current takes two paths, one of which is through the lead 137 back to the terminals 78—79 in the switch 67, and through the lead 147 to the motor armature 146 and to ground 148. The other path by-passes the switch 67 and places the switch 57 in parallel therewith, with respect to the field circuit. Here, the current crosses—from the terminal 128—the contact row 107 to the terminal 127, through the lead 142 to the field 143, and through the field 143 from left to right, as viewed in Fig. 9, and in the same direction as the current passing through the armature 146. The current then passes through the lead 141 to the terminal 124, across the contact row 106 to the terminal 125, and to the ground 132 of the switch 57 via the plate 133.

Thus, as was the result of the circuitry arrangement of Fig. 8 wherein the hand-operated switch 67 was "on" and the foot-actuated switch 57 was in the "park" position, the result of the circuitry arrangement of Fig. 9, wherein the positions of the switches are respectively reversed, is the same in that the wiper motor 22 is energized and the direction of current through the armature 146 and field 143 circuits is the same. Upon a return of the foot lever 36 to its normal, non-depressed position, the contact carrier assembly 90 is returned to its compressed position, wherein the control circuitry illustrated in Fig. 5 is effectuated. As described hereinbefore with respect to Fig. 8, a reversal of current is effected in the field 143 circuit, whereby the wipers 24 are returned to their "park" position, with the control circuit being open.

Referring now to Fig. 10, the situation is assumed wherein the hand-operated switch 67 is "on" and the foot-actuated switch is also placed in an "on" position. Battery current is transmitted through the terminals 71—78—79 of the switch 67 to the lead 147 and through the armature 136 to ground 148. The field 143 receives current in the same direction as the current of the armature by the current being transmitted from the terminal 78 through the lead 137 to the terminal 128 in the switch 57, from whence it crosses the contact row 107 to the terminal 127, through the lead 142 and the field 143 from left to right. The current is then transmitted back through the lead 141 to the terminal 124 and across the contact row 106 to the terminal 125 and to the switch 57 ground 132 via the plate 133.

Upon a return of the foot-actuated switch 57 to its "park" position with the hand-operated switch 67 remaining "on," the control circuitry of Fig. 8 would be repeated, wherein the field ground would be changed from the switch 57 ground to the ground 74 of the switch 67, the motor 22 continuing to operate in a forward direction.

In summary, it is seen that a control circuit for a windshield clearing system including an electric wiper unit and a washer unit is provided, wherein a hand-operated switch and a foot-actuated switch, the latter switch being dependent upon operation of the washer unit, are interposed in the circuit for selective operation of the wiper unit, either independently of each other or in combination.

Although a preferred embodiment of the invention has been disclosed and described, it is not to be so limited, as alterations and modifications may be had within the full scope of the invention as defined in the appended claims.

I claim:

1. For use with a vehicle having a windshield wiping unit including wipers and an electric motor for operating said wipers through a mechanism, and a windshield washing unit including a nozzle device for directing a fluid against the windshield and a foot-operated pump device for supplying fluid under pressure to said nozzle device in response to a depressing movement of a two-position lever, a circuit having a source of power for said units and open when said wipers are in a parked position, first switch means in said circuit for selectively controlling the direction of current through the field of said motor relative to the direction of current through the armature thereof, whereby to control the direction of rotational output of said motor and the movement of said wipers in either an operating direction or a parking direction, and second switch means in said circuit having movable and stationary parts for selectively controlling the direction of current through said motor field relative to that of said motor armature independently of said first switch means, said second switch means including contacts on respective ones of said parts movable relative to contacts on respective others of said parts dependent upon the position of said lever.

2. For use with a vehicle having a windshield wiping unit including wipers and an electric motor for operating said wipers through a mechanism, and a windshield washing unit including a nozzle device for directing a fluid against the windshield and a foot-operated pump device for supplying fluid under pressure to said nozzle device in response to a depressing movement of a lever, a circuit having a source of power for said units and open when said wipers are in a parked position, switch means in said circuit for connecting said power source through a first path to said motor armature and through a second path to said motor field, said switch means operable to reverse the flow of current through said second path whereby to alternate the direction of said wiper movement between an operating movement and a parking movement, and second switch means in said circuit operable in response to said lever depressing movement to move from a position wherein said second switch means is interposed in series in said second path to one of parallel whereby said current to said motor field is reversed in direction.

References Cited in the file of this patent

UNITED STATES PATENTS

| | | |
|---|---|---|
| 2,705,812 | Miller et al. | Apr. 12, 1955 |
| 2,743,473 | Oishei | May 1, 1956 |
| 2,816,316 | Oishei | Dec. 17, 1957 |
| 2,870,476 | Oishei | Jan. 27, 1959 |